United States Patent
Carrer et al.

(10) Patent No.: US 9,071,567 B2
(45) Date of Patent: Jun. 30, 2015

(54) WORKSPACE-AWARE SOCIAL NETWORKS IN AN ENTERPRISE

(75) Inventors: Marco Carrer, Reading, MA (US); Chen Zhou, Holden, MA (US); Amit C. Dhuleshia, North Andover, MA (US); Gopalan Arun, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 2 days.

(21) Appl. No.: 13/150,339

(22) Filed: Jun. 1, 2011

(65) Prior Publication Data

US 2012/0198358 A1    Aug. 2, 2012

Related U.S. Application Data

(60) Provisional application No. 61/437,797, filed on Jan. 31, 2011.

(51) Int. Cl.
| | | |
|---|---|---|
| G06F 3/00 | (2006.01) | |
| H04L 12/58 | (2006.01) | |
| G06Q 10/10 | (2012.01) | |
| G06Q 50/00 | (2012.01) | |

(52) U.S. Cl.
CPC ............... H04L 51/32 (2013.01); G06Q 10/10 (2013.01); G06Q 50/01 (2013.01)

(58) Field of Classification Search
CPC .................. G06F 17/30867; G06F 17/308996
See application file for complete search history.

(56) References Cited

U.S. PATENT DOCUMENTS

| | | | |
|---|---|---|---|
| 5,107,443 A | 4/1992 | Smith et al. | |
| 6,643,661 B2 | 11/2003 | Polizzi et al. | |
| 6,804,710 B1 | 10/2004 | Kawada et al. | |
| 7,512,628 B2 | 3/2009 | Chess et al. | |
| 7,596,597 B2 | 9/2009 | Liu et al. | |
| 7,610,294 B2 * | 10/2009 | Borgsmidt | 1/1 |
| 7,689,537 B2 | 3/2010 | Goodwin et al. | |
| 8,464,161 B2 * | 6/2013 | Giles et al. | 715/751 |
| 2002/0124053 A1 | 9/2002 | Adams et al. | |
| 2004/0104947 A1 | 6/2004 | Schmitt | |
| 2005/0171799 A1 * | 8/2005 | Hull et al. | 705/1 |
| 2007/0038594 A1 * | 2/2007 | Goodwin et al. | 707/2 |
| 2008/0059576 A1 * | 3/2008 | Liu et al. | 709/204 |
| 2009/0031004 A1 | 1/2009 | Yagoda et al. | |
| 2009/0144627 A1 * | 6/2009 | O'Sullivan et al. | 715/733 |
| 2009/0144637 A1 | 6/2009 | O'Sullivan et al. | |
| 2010/0030734 A1 * | 2/2010 | Chunilal | 707/3 |
| 2010/0057858 A1 | 3/2010 | Shen et al. | |
| 2011/0022967 A1 | 1/2011 | Vijayakumar et al. | |
| 2011/0078190 A1 * | 3/2011 | Samuel et al. | 707/780 |
| 2011/0231363 A1 * | 9/2011 | Rathod | 707/609 |
| 2012/0089565 A1 * | 4/2012 | Jackson | 707/608 |

OTHER PUBLICATIONS

Colt et al., Oracle Collaboration Suite, Deployment Guide, 10g Release 1 (10.1.1) B14479-02, Oct. 2005, Chapter 13—Background for Workspaces, pp. 13-1 thru 13-10.

IBM, "IBM Websphere Portal Server Product Architecture V2.1," Nov. 19, 2001, pp. 1-32.

* cited by examiner

*Primary Examiner* — Matt Kim
*Assistant Examiner* — Hua Lu
(74) *Attorney, Agent, or Firm* — Kraguljac Law Group, LLC

(57) ABSTRACT

Systems, methods, and other embodiments associated with generating social networks are described. In one embodiment, a method includes generating recommendations for expanding a social network for a user based at least in part on the user's membership to a workspace and other members of the workspace.

20 Claims, 3 Drawing Sheets

WORKSPACE-AWARE SOCIAL NETWORKS IN AN ENTERPRISE

CROSS REFERENCE TO RELATED APPLICATIONS

This application claims the benefit of U.S. provisional patent application Ser. No. 61/437,797 filed on Jan. 31, 2011, which is hereby wholly incorporated by reference.

BACKGROUND

Electronic social networking is a popular way for individuals to communicate with one another. Social networking web sites allow users to connect for various personal, professional and common interests. Electronic social networking systems are dependent upon users connecting to and identifying other individuals within the social network as "friends," those individuals with whom they are willing to share greater access to personal information than non-friends. A person's identified friends are sometimes maintained in a "buddy list."

Most social networking systems include some mechanism for allowing users to find "friends" within the social network. One example of such a friend finding mechanism uses contact lists and performs an e-mail search query, inviting users to upload addresses, search for names, or access address books run by popular e-mail services, after which the system attempts to match the user addresses with other network members. If addressees in the user's contact list are not members of the network, an opportunity to invite the addressee is provided. Other algorithms identify "friends of friends," or network members which are connected to one's own friends within the social network.

Traditional social-network applications operate based on the personal contact or buddy list of the users in the system. As users interact with each other, they may add new contacts into their personal contact list. The social network application then tries to expand the user's social network by providing suggestions for common friends and "friends of friends" based on their personal contact list. More advanced social networks may try to derive groups of contacts based on common aspects like their education or hobbies that are stored in the contact list so that users can explore the social network using one of these dimensions.

In a corporate and enterprise environment, social network applications have been limited to the most traditional contact list. Providing additional dimensions to explore the social network has generally failed because of security and privacy considerations. For those reasons, corporate social networks have been limited to the personal interactions between single corporate users.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. One of ordinary skill in the art will appreciate that in some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

In one embodiment, a workspace-aware system and method is described herein that generates recommendations to expand someone's social network based on workspace memberships. Generally, a "workspace" is a logical place where collaboration happens, and it is also a container for services and collaboration content. The workspace-aware system is based at least in part on the recognition of the workspace and its membership as a new dimension for determining and generating a user's corporate social network. The user's contact list is no longer the only input for the social network. The contact list operates on the principle of "who knows who." By contrast in one embodiment, the present system operates on the principle of "who is doing what with whom" or "who is working with whom on what." By having access to the set of workspaces the user is a member of, the system determines the set of projects he/she has been involved with and the set of people he/she has been interacting with as this is derived from the workspace membership.

In one embodiment, workspace members are given a greater weight and/or priority for determining/recommending social network lists than other dimensions (e.g. people in a personal contact list). In one embodiment, the system determines users from memberships in workspaces in common with a person and generates a workspace-aware social network for the person (e.g. display a list of recommended people to connect with in a social network based on workspace memberships).

Figure 1:
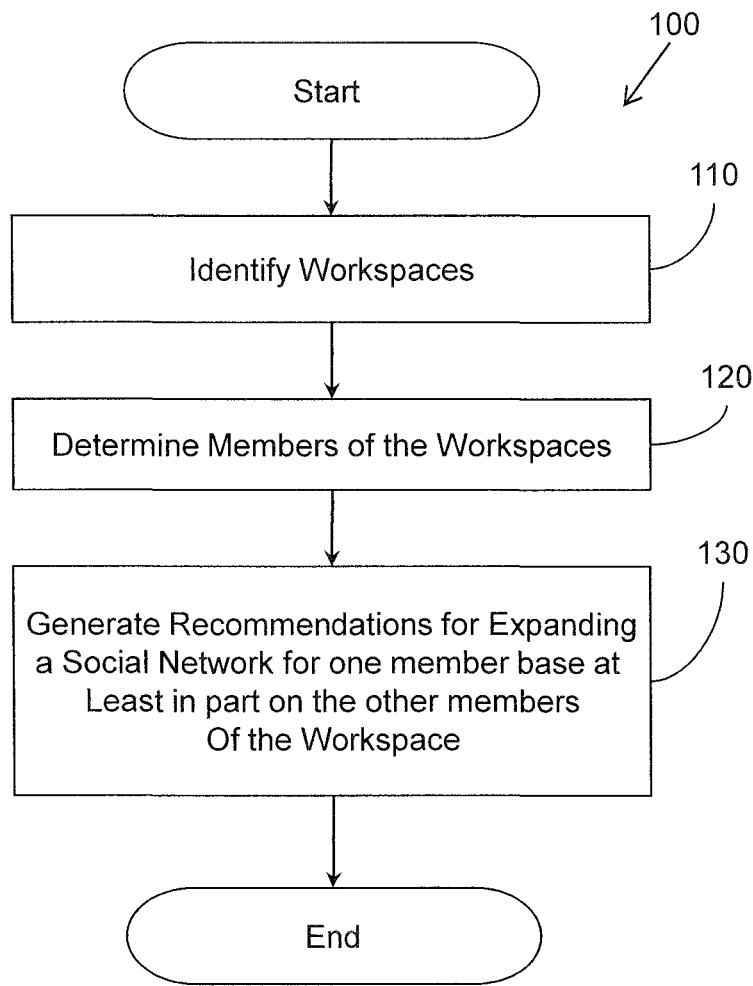
FIG. 1 illustrates one embodiment of a method associated with generating recommendations for expanding a user's social network.

With reference to FIG. 1, one embodiment of a method 100 is illustrated that is associated with making social networking recommendations to a user. At 110, one or more workspaces are identified. In one embodiment, a workspace is defined within a corporate enterprise environment and information that defines workspaces can be searched. Workspaces are described in more detail below. For a targeted user (e.g. Marco) that the method 100 is attempting to expand his social network, the method identifies the workspaces that Marco is a member of. At 120, members of the workspaces are determined. In one embodiment, the members of a workspace are defined in a list of members that is stored as metadata, data in a database, and so on. Once the workspace(s) is identified that the user is a member of, the membership list of the workspace is accessed to retrieve names of other members.

At 130, recommendations for expanding the social network for Marco (e.g. a member of the workspace) are generated based at least in part on the other members of the workspace. Thus the workspace members in common with the targeted user are a dimension used to determine who to recommend. The principle of "who is doing what with whom" or "who is working with whom on what" is applied by using the workspace information since workspaces are collaborative work environments.

A recent shift in enterprise applications from a set of personal productivity tools to a much richer collaborative environment has created new opportunities relevant to social networking. More and more collaborative applications now revolve around the concept of a team workspace, which provides the context and the tools for its members to work together (e.g. work and collaborate on a common project or job).

In one embodiment, the workspace-aware method 100 leverages such transition to implement a model, and a system, for workspace-aware social networks in an enterprise where both the individual personal network as well as his/her workspace memberships are leveraged to generate a more effective social-network solution.

On a very high level, a "workspace" is a logical place where collaboration happens, and it is also a container for services and collaboration content. The workspace is created and defined in a computing environment. In the workspace, there is normally an "owner" (often the creator of the workspace), and other members who are participating in collaboration in the workspace. Members have different assigned roles in the workspace that reflect their collaboration in the workspace. Roles can include coordinator, participant, writer, reader, administrator, content contributor, policy writer, policy approver, and so on. In one embodiment, a team workspace template can specify the roles that are granted or assigned to workspace members within the scope of the workspace. For example, the role reflects a member's type of job/duties to be contributed by the member within the workspace. Each different role can include privileges and access types that are granted (or denied) to a member in the scope of the workspace that control security within the workspace.

Workspaces provide members/actors with a container and context in which information can be organized and collaborative activities can occur. A workspace member is sometimes referred to as an "actor." An actor refers to a physical person or can be an integrating system (such as an E-business application) that is a member of the workspace and will collaborate with the workspace.

In one embodiment and in a general form, a workspace is presented to a user as a container of interesting information related to either a time bound project (e.g., a product launch) or an ongoing project (e.g., a business practice improvement). The container model is hierarchical and can be many levels deep.

A shared workspace is a location where team collaboration occurs. For the purposes of team collaboration, workspaces provide a role and activity structured environment—users are provided with task-oriented collaboration tools to facilitate ad-hoc activities such as finding/creating/reviewing/approving content, scheduling and managing meetings or tasks, communicating with the team and sharing lists of information (e.g., open issues, brainstorming ideas, etc). In one embodiment, a graphical user interface is configured for the workspace to provide a mechanism to manage membership, allocate roles, assign activities, manage content and communicate with the team.

In one embodiment, access control for the workspace is governed by a set of workspace permissions, which are used to model a security policy (e.g., who can perform what actions in the workspace). Workspace rules can be used to enforce business policies. Templates can be generated to allow a user to setup a workspace with a predefined structure, content and rules around a project. The workspace provides mechanisms to generate 'views' of information. 'Break-Out Spaces' can be used for sub-teams to collect, discuss, consolidate and promote applicable content, lists and reports that should be created and shared with the rest of the team.

Figure 2:
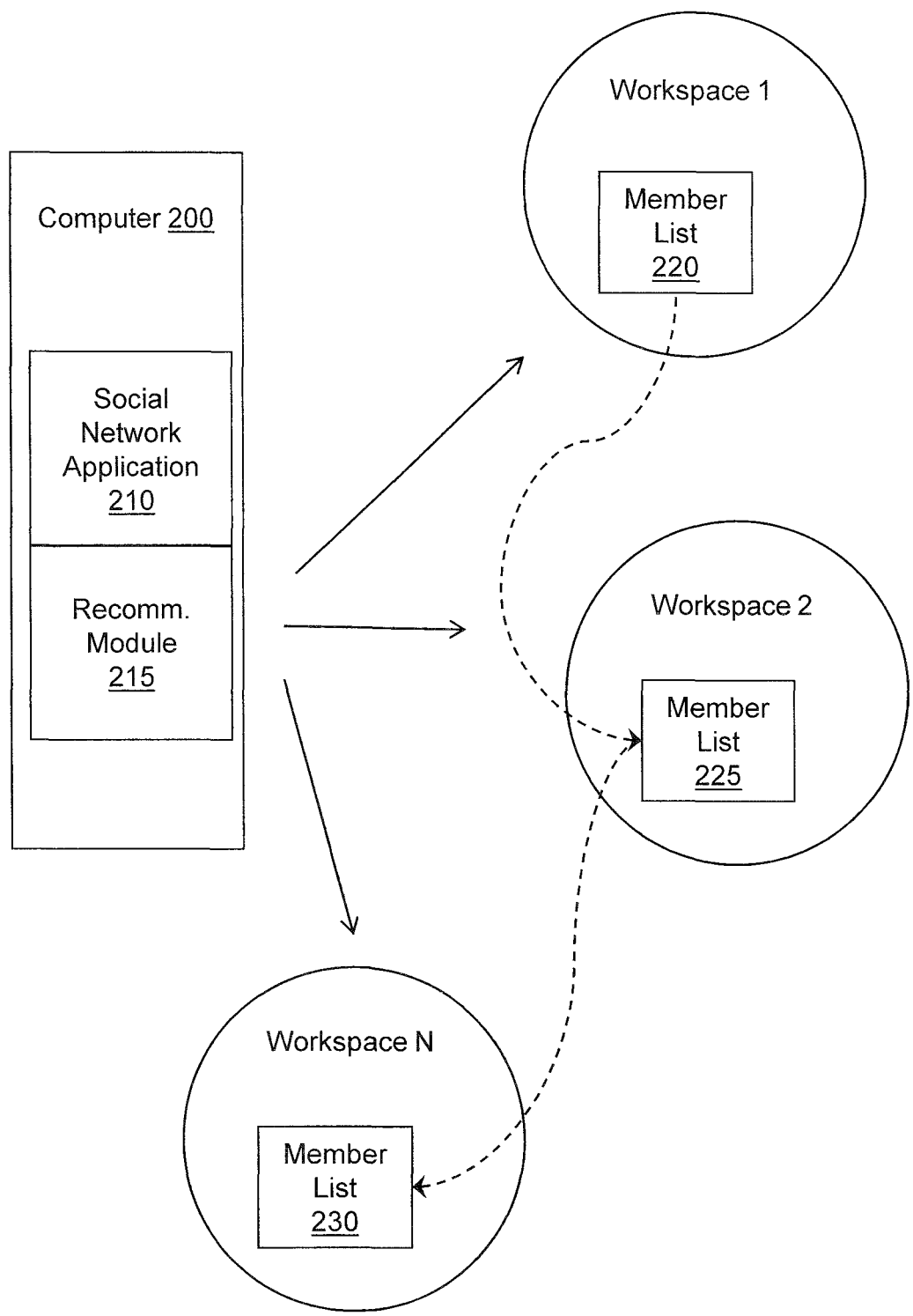
FIG. 2 illustrates one embodiment of system for making recommendations and an example environment that includes a number of workspaces.

FIG. 2 illustrates one embodiment of a computer system 200 that is configured to generate social network recommendations using information from workspaces. FIG. 2 also illustrates example components of a corporate enterprise that includes a number of workspaces 1, 2 . . . N, which have been described previously. The workspaces 1, 2 . . . N are illustrated as logical components. In one embodiment, one or more of the workspaces are defined in a database that allows for the creation and management of workspaces and their attributes. Information about a workspace can be published in a directory.

In one embodiment, each workspace 1, 2 . . . N is defined in one or more computer storage mediums, for example, by metadata and/or other data. Each workspace defines at least a work project and includes a list of workspace members 220, 225, and 230 that have joined the workspace to collaborate on the work project.

The computer 200 includes a social network application 210 configured to make recommendations via a recommendation module 215 to expand a social network of a selected user. For the selected user, the social network application 210 searches the data that defines the workspaces and identifies the workspaces that the selected user is a member of. Then for the identified workspaces, the recommendation module 215 determines the other members of the identified workspace based on the list of workspace members for the corresponding workspace. For example, if the selected user is a member of workspace 2, then the member list 225 of workspace 2 is searched and its member names are retrieved.

Once the names of the workspace members are identified, the recommendation module 215 generates the recommendations to expand the social network for the selected user from the members of the identified workspaces. Thus, suggested names of people that the selected user may add to the social network are provided (e.g., in a displayed form). The assumption here is that people with whom the selected user is working with in a common project (e.g. the workspace) are likely to be good candidates to add to one's social network. It will be appreciated that in very large corporations (e.g., 10,000 plus employees) a person belonging to a workspace may not know who the other members of the workspace are. Members can be in different corporate departments, different buildings, different states, or even different countries where their only form of contact is electronic communication.

In one embodiment, the recommendations can be filtered to give weight to some workspace members over others. For example, members that have similar properties as the selected user may be more likely to have more in common with the selected user. Members that have similar roles in the workspace (or members that have similar roles in a different workspace) as the selected user can be given a greater weight and thus get a higher recommendation. In one embodiment, an algorithm is configured to compute which members are more likely to be "friends" with the selected user (e.g. based on similar characteristics). For example, people that show up as members more frequently in the same workspaces as the selected user can be given a higher weight. As an example, suppose the selected user is a member of five workspaces, and in all five workspaces John is also a member and Bob is a member of only one of the five workspaces. The algorithm computes a higher weight for John as compared to Bob. Thus, John is displayed with a higher recommendation to be added to the social network of the selected user.

In one embodiment, the list of workspace members 220, 225, 230 is defined by metadata or other data. The list may include names of persons, email addresses, phone numbers, and other attributes of the corresponding person (e.g., company title, department, role in workspace, etc). To identify which workspaces the selected user is a member of, the recommendation module 215 searches the metadata that defines the list of workspace members for each of the workspaces.

The member lists 220, 225, 230 may be stored in a central location (e.g., a common database that defines workspaces and members). Once member names are retrieved from one workspace, the names may be searched in other workspaces to identify other potential recommendations from other workspace member lists (e.g., lists 225, 230 as denoted by the dashed lines).

In another embodiment, one or more security aspects can be implemented. For example, the workspaces 1, 2, N may include a public summary of information stored in a computer-readable medium where the public summary is accessible to anyone. The public summary can be configured to identify its members and thus allows the recommendation module to determine the member lists of the workspaces. Other portions of the workspace are can be secured from access. Other security aspects are described below.

In one embodiment, the generated workspace-aware social network is used to ignite user interactions within the enterprise by providing a system that can make more educated suggestions for social network expansions. On the contrary to the traditional systems, in a workspace-aware social network, the user's network is not simply expanded through a growing number of contacts in the user's buddy list. Here, the user's network is more effectively expanded by having users join workspaces, therefore becoming aware and involved in more projects in the enterprise. This leads to a more focused personal network where contacts are automatically grouped by the nature and context of the collaboration in the workspace with a goal of boosting knowledge sharing in the enterprise.

Security Aspects

With continued reference to FIG. 2, in one embodiment, the workspaces 1, 2 . . . N are corporate objects and they may be protected by corporate access control policies. As such, security concerns can be tied to the access policies configured on the workspace. In one embodiment, the following features in the workspace model can be leveraged to achieve security in the workspace-aware social network application 210.

Workspace Directory and Workspace Public Summary: In one embodiment, the workspace-aware system is implemented with an interface that provides workspace administrators a mechanism to configure a public summary for the workspace and have the workspace, optionally, published into a public workspace directory. This is a way for advertising the workspace to the whole organization/company without exposing security related information that should be strictly accessible only to workspace members.

Workspace Membership Mode: A workspace can be configured with a membership policy that regulates the process to be followed to add new workspace members. Examples for those modes include: open, any user can self-join the workspace; restricted, a user has to apply and be approved to be able to join; and invitation-only, where workspace administrator must add the new user explicitly. In one embodiment, the system controls the workspace directory to list only workspaces that have a membership mode of open or restricted.

Workspace access: In one embodiment, workspace members are granted a certain level of access into the entities or objects stored as part of that workspace. At a minimum, workspace members may be granted read access into the workspace.

Workspace-Aware Networks

Collaborative applications, which feature workspace-aware social networks as generated by the present system and method, assists users in several of their activities by providing opportunities for social network expansion. This will increase the user awareness of other on-going activities in the enterprise and, eventually, provide higher sharing of information within the enterprise. In one embodiment, one or more of the following presentation/visualization techniques may be employed to make an effective use of the workspace-aware social network:

List of workspaces a user is a member of. Here is a typical use case: when receiving an email from another person in the enterprise, the user often resorts to the organization chart to "visualize" the type of work the person is involved with. However, in cross-functional organizations this is not very accurate as the organization chart will neither reflect the current projects—nor the past projects—the person has been involved with. By determining and showing the workspaces the user is a member of, a more accurate picture of the experience and expertise of that person can be seen.

Depending on the level of access granted to the workspaces, more information can be available. For example, for workspaces a user is member of, he/she can see all the contributions of another person (e.g., a candidate to include in their social network); for workspaces the user is not a member of, he/she can still get the public summary (e.g. public project description) published in the workspace directory. This will all lead to a much informed, and therefore effective, communication with the other person.

In one embodiment, based on the security infrastructure described above, when listing the workspaces a user is a member of, some workspaces may not be returned or displayed. For example, if the user is a member of a workspace which is not published in the directory and/or whose membership mode is invitation-only, the system can determine not to list or display such a workspace for security reasons. On the other hand, depending on the membership mode policy, the user can join some of the listed workspaces and get access to even more information such as the persons he/she has worked with.

Figure 3:
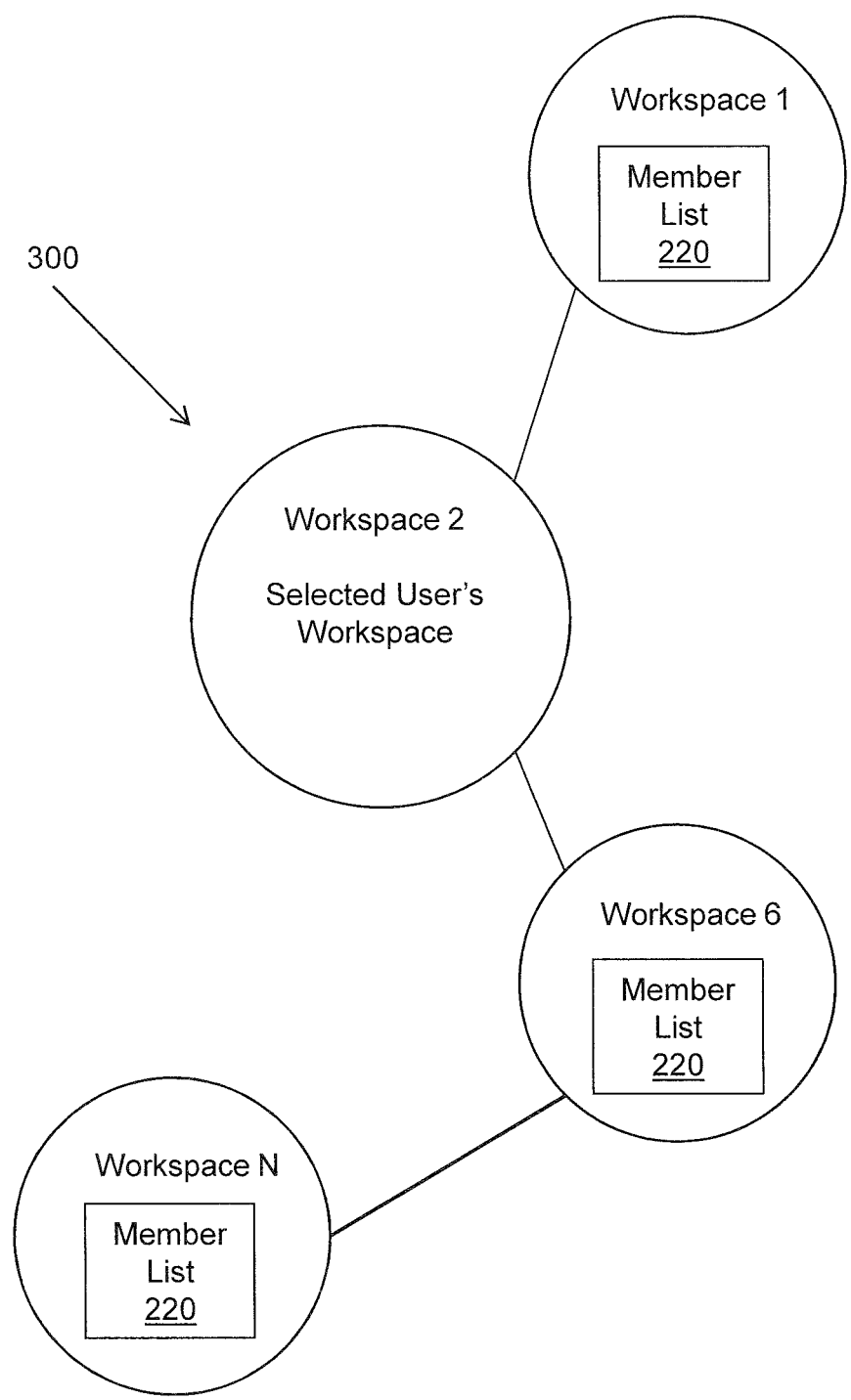
FIG. 3 illustrates one embodiment of a displayed workspace-centric layout.

With reference to FIG. 3, in one embodiment, the social network application 210 is configured to generate and display workspace networks in a visual presentation 300. Social-networks are generally visualized using persons as nodes: a link between one node (person A) and another one (person B) implies that person B is in the contact list of person A or vice versa. By adding the new dimension of workspace membership for recommending and expanding social-networks, the social network application 210 provides a workspace-centric layout 300 to display a workspace-aware social network where workspaces are defined and displayed as nodes. This allows users to switch back-and-forth between a user-centric network layout and the workspace-centric layout.

For example, for any node in the user-centric network, a user can switch to the workspace-centric layout 300, which would be initially centered around the workspace the user is a member of (e.g. workspace 2). In this display layout, each workspace is displayed as a node and each link between workspaces represents the fact that two workspaces have one or more common members (e.g. workspace nodes 1, 6, and N). "Weight" or a weighing factor can be put on each workspace node based on a user's rating and activities. The added or reduced weight then affects the recommendations of the members of the node when made by the recommendation module 215. The visualization layer can use different techniques to make an effective usage of this information and provide visual differences (e.g. different graphical properties). For example: the higher the number of common members between two workspaces, the thicker the rendition of the displayed link (e.g. link between node 6 and N can be darker or wider); the higher the number of members in the workspace, the bigger the workspace node is displayed relative to other workspace nodes, and so on.

Contextual information can also be available on each workspace node. For example a pop-up window can display the workspace public summary and provide an opportunity for the user to join the workspace.

With reference again to FIG. 2, in another embodiment, the social network application 210 is configured to generate recommendations of users who joined a workspace that also joined other workspaces. In one embodiment, when a user joins a workspace (e.g. workspace 2), the social network application 210 is configured to automatically recommend other workspaces (e.g., workspace 1 and/or N) joined by users who are also members of workspace 2. Those workspaces are very likely to discuss aspects closely related to the workspace 2 in question. Thus the recommendation module 215 can include a workspace recommendation engine that is tuned using several factors including user's "appreciation" of a workspace based of ratings and favorites, activities and/or in combination with the user's trusted network of contacts in the user's personal buddy list.

In one embodiment, the social network application 210 is configured to generate suggestions for new workspaces and their members. By monitoring the user's interaction with other users' in the enterprise, the application 210 can determine recommendations for new workspaces and their initial members. This is one way of contextualizing the user's interaction into the appropriate collaborative tool.

In one embodiment, the social network application 210 is configured to generate suggestions for workspace merging. Workspace member lists can be compared. When two workspaces have most of their membership overlapping based on a defined threshold, the application 210 can generate a suggestion to merge these workspaces into one workspace. Contents from both workspaces can be combined, and collaboration becomes simpler. Additionally, fewer workspaces in the enterprise can result in less system resource consumption.

In another embodiment, the social network application 210 is configured to recommend a community formation. Based on the workspace networks, a community may be formed based on identifying common properties between workspaces. For example, a community is a set of closed workspaces that share some common members and activities (e.g. based on a predetermined threshold number or percentage of commonality). This is different than the traditional organization chart. The application 210 analyzes workspace properties, compares them, and generates a community based on knowledge/expertise sharing and common interests. A community can be a loose organization, and can facilitate large-scale/high-level collaboration when necessary.

With the present systems and methods, the workspace-aware system adds a new dimension to social-networks based on workspace membership, which closely relates to a set of projects/teams a user has been involved with. This is helpful information for making more educated suggestions to users on how to expand their social networks. Thus a user's social-network is not just based on contacts in their personal buddy list but is based on the projects/workspaces he/she is a member of. This keeps the user-contact relationship closer to the context of the collaboration. Of course, both the workspace memberships and the contact list can be combined to generate recommendations to expand the user's social network.

By allowing social-networking based projects, information sharing and the development of cross-functional groups based to a certain shared expertise can be encouraged by the system.

DEFINITIONS

In one embodiment, the described systems, methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the method. One or more embodiments include a computing device (e.g., computer 200 in FIG. 2) that has at least one processor, memory, output device, computer-readable medium, and so on that is configured to perform one or more of the functions described herein.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Logic", as used herein, includes but is not limited to hardware, firmware, a non-transitory computer readable medium that stores instructions, instructions in execution on a machine, and/or combinations of each to perform a function(s) or an action(s), and/or to cause a function or action from another logic, method, and/or system. Logic may include a microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. Logic can be used to implement one of more functions described herein and/or their equivalents.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use. See, Bryan A. Garner, A Dictionary of Modern Legal Usage 624 (2d. Ed. 1995).

What is claimed is:

1. A non-transitory computer-readable medium storing computer-executable instructions that when executed by a computer cause the computer to perform a method, the method comprising:
for a selected user, searching for a plurality of workspaces defined in a computing environment and identifying, by the computer, one or more workspaces in the computing environment which the selected user is a member of, wherein a workspace defines with data at least a work project and a list of members that are assigned to collaborate in the work project, and wherein the one or more workspaces are separate and different objects in the computing environment than a social network;
determining, by the computer, members of the workspaces identified which the selected user is a member of by retrieving member names from the list of members from the workspaces identified without searching a contact list from the social network; and
generating, by the computer, recommendations that identify one or more of the retrieved member names from the identified workspaces for expanding a social network for the selected user of the workspace based at least in part on the retrieved member names from the workspaces identified.

2. The non-transitory computer-readable medium of claim 1, further comprising generating a public summary of information for the one or more workspaces where the public summary is accessible to determine the members of the workspace and wherein other portions of the workspace are secured from access.

3. The non-transitory computer-readable medium of claim 1, further comprising defining the one or more workspaces as nodes, and assigning a weight to one or more of the nodes that affect the recommendations of the members of the node.

4. The non-transitory computer-readable medium of claim 1, wherein the list of members of a workspace is a different list than a contact list contained by the social network.

5. The non-transitory computer-readable medium of claim 1, wherein generating the recommendations for the selected user includes combining recommendations based on the members of the workspace and recommendations based on members of a contact list of the selected user.

6. A system comprising:
at least one processor configured to at least execute instructions;
a plurality of workspaces defined in one or more computer storage mediums, wherein each workspace defines a work project and includes a list of workspace members that collaborate on the work project;
a non-transitory computer readable medium storing a social network application configured to make recommendations to expand a social network of a selected user, wherein the social network is a separate object from the plurality of workspaces, and wherein the social network application is configured with instructions executable by the at least one processor to make recommendations by:
identifying, by the at least one processor, one or more workspaces that the selected user is a member of and determining other members of the identified workspaces by searching and retrieving member names from the list of workspace members, where the list of workspace members is a different list than a contact list maintained by the social network; and
generating, by the at least one processor, the recommendations for the selected user based at least in part on the member names retrieved from the identified workspaces, wherein the recommendations identify selected members from the identified workspaces.

7. The system of claim 6, wherein at least one workspace within the plurality of workspaces is defined by metadata, and wherein the list of workspace members is defined by metadata.

8. The system of claim 6, wherein the social network application is configured to identify the one or more workspaces that the selected user is a member of by searching for the plurality of workspaces defined in the computer storage mediums and searching metadata that defines the list of workspace members for each of the workspaces.

9. The system of claim 6, wherein the list of workspace members is not maintained by the social network; and
wherein searching and retrieving member names from the list of workspace members does not include searching contacts in the social network.

10. The system of claim 6, wherein a workspace from the plurality of workspaces defines at least a work project and a group of members that are assigned to collaborate in the work project.

11. The system of claim 6, wherein the plurality of workspaces include a public summary of information where the public summary is accessible to determine the members of the workspace and wherein other portions of the workspace are secured from access.

12. The system of claim 6, wherein the social network application is configured to compare the list of workspace members from two workspaces and if a threshold number of members overlap, a suggestion to merge the two workspaces into one workspace is generated.

13. The system of claim 6, wherein the social network application is configured to generate and display workspace networks in a visual presentation as a workspace-centric layout where workspaces are display as connected nodes based on common members.

14. A computer-implemented method comprising:
for a targeted user, searching for a plurality of workspaces defined in a computing environment, and wherein each workspace defines at least a work project and a list of workspace members that are assigned to collaborate in the work project;
for the targeted user, identifying, by at least a processor, workspaces that the targeted user is a member of by searching the list of workspace members from the plurality of workspaces searched, and wherein the list of workspace members is a separate and different object stored in the computing environment than contacts maintained by a social network;
determining, by at least the processor, other members of the identified workspaces by searching and retrieving member names from the list of workspace members assigned to the identified workspace, wherein the processor accesses the list of workspace members from a computer storage medium; and generating, by at least the processor, recommendations to expand a social network of the targeted user based at least in part on the retrieved member names of the identified workspaces from the list of workspace members, wherein the recommendations are displayed on a display screen and identify selected members from the identified workspaces.

15. The method of claim 14 wherein generating the recommendations includes identifying names of the other members that belong to the same workspace as the targeted user.

16. The method of claim 14 wherein generating the recommendations includes:
    determining an assigned working role for each member within the identified workspace; and
    adding a weight factor for members that have a similar working role as the targeted user.

17. The method of claim 14, further comprising comparing membership lists from two workspaces and if a threshold number of members overlap, generating a suggestion to merge the two workspaces into one workspace.

18. The method of claim 14, wherein the workspaces are identified within a corporate enterprise.

19. The method of claim 14, wherein searching and retrieving member names from the list of workspace members does not include searching contacts maintained by a social network.

20. The method of claim 14, further comprising:
    automatically recommending other workspaces for the targeted user to join based on the members of the workspace.

* * * * *